US009419861B1

(12) United States Patent
Ananchaperumal

(10) Patent No.: US 9,419,861 B1
(45) Date of Patent: Aug. 16, 2016

(54) MANAGEMENT INFORMATION BASE TABLE CREATION AND USE TO MAP UNIQUE DEVICE INTERFACE IDENTITIES TO COMMON IDENTITIES

(71) Applicant: CA, Inc., Islandia, NY (US)

(72) Inventor: Dhesikan Ananchaperumal, Shrewsbury, MA (US)

(73) Assignee: CA, Inc., New York, NY (US)

( * ) Notice: Subject to any disclaimer, the term of this patent is extended or adjusted under 35 U.S.C. 154(b) by 301 days.

(21) Appl. No.: 14/063,620

(22) Filed: Oct. 25, 2013

(51) Int. Cl.
*H04L 12/24* (2006.01)
*G06F 17/30* (2006.01)

(52) U.S. Cl.
CPC .......... *H04L 41/12* (2013.01); *G06F 17/30345* (2013.01); *H04L 41/0213* (2013.01); *H04L 41/0806* (2013.01)

(58) Field of Classification Search
None
See application file for complete search history.

(56) References Cited

U.S. PATENT DOCUMENTS

| | | | | | |
|---|---|---|---|---|---|
| 5,822,569 | A | * | 10/1998 | McPartlan | H04L 41/0213 703/21 |
| 5,903,568 | A | * | 5/1999 | Tanaka | H04L 29/06 370/469 |
| 6,243,457 | B1 | * | 6/2001 | Lin | H04M 3/42144 370/466 |
| 6,895,436 | B1 | * | 5/2005 | Caillau | H04L 12/24 709/223 |
| 7,013,084 | B2 | * | 3/2006 | Battou | G06F 8/65 398/45 |
| 7,079,555 | B2 | * | 7/2006 | Baydar | H04J 3/1611 370/532 |
| 2002/0156880 | A1 | * | 10/2002 | Mokuya | H04L 41/0213 709/223 |
| 2003/0046381 | A1 | * | 3/2003 | Mokuya | H04L 41/0226 709/223 |
| 2003/0074436 | A1 | * | 4/2003 | Gieseke | H04L 41/0213 709/223 |
| 2004/0049575 | A1 | * | 3/2004 | Ikeda | H04L 12/2803 709/224 |
| 2005/0010695 | A1 | * | 1/2005 | Coward | H04L 49/552 709/253 |
| 2006/0139679 | A1 | * | 6/2006 | Barry | G06F 3/1212 358/1.13 |
| 2008/0010366 | A1 | * | 1/2008 | Duggan | H04L 41/0853 709/223 |
| 2008/0196100 | A1 | * | 8/2008 | Madhavan | H04L 63/145 726/22 |
| 2008/0232801 | A1 | * | 9/2008 | Arnold | H04L 41/0803 398/58 |
| 2008/0280631 | A1 | * | 11/2008 | Lee | H04W 48/12 455/458 |
| 2008/0310421 | A1 | * | 12/2008 | Teisberg | H04L 12/4641 370/395.53 |
| 2009/0168781 | A1 | * | 7/2009 | Fung | H04L 63/0272 370/395.1 |
| 2009/0221293 | A1 | * | 9/2009 | Petrovic | H04W 48/10 455/450 |
| 2009/0274086 | A1 | * | 11/2009 | Petrovic | H04J 11/0093 370/312 |
| 2010/0022250 | A1 | * | 1/2010 | Petrovic | H04J 11/0093 455/450 |
| 2010/0272004 | A1 | * | 10/2010 | Maeda | H04L 5/0007 370/312 |
| 2011/0261777 | A1 | * | 10/2011 | Maeda | H04W 48/20 370/329 |
| 2011/0280223 | A1 | * | 11/2011 | Maeda | H04W 72/082 370/335 |
| 2012/0039256 | A1 | * | 2/2012 | Kwon | H04W 48/12 370/328 |
| 2012/0063370 | A1 | * | 3/2012 | Worrall | H04W 74/006 370/280 |

* cited by examiner

*Primary Examiner* — Ninos Donabed
(74) *Attorney, Agent, or Firm* — Myers Bigel & Sibley, P.A.

(57) ABSTRACT

A management information base (MIB) mapping controller discovers presence of an electronic device accessible through a network connected to the MIB mapping controller. A MIB table contains information mapping device interface variables for interfaces of electronic devices to common interface variables. The MIB table is accessed to determine whether the MIB table contains particular information mapping an device interface variable for an interface of the electronic device to one of the common interface variables known by the common access interface. Responsive to determining that the MIB table does not contain the particular information, new information is determined that maps the device interface variable for the interface of the electronic device to one of the common interface variables known by the common access interface. The new information is added to the MIB table. Related methods in a MIB mapping controller are disclosed.

18 Claims, 4 Drawing Sheets

US 9,419,861 B1

MANAGEMENT INFORMATION BASE TABLE CREATION AND USE TO MAP UNIQUE DEVICE INTERFACE IDENTITIES TO COMMON IDENTITIES

TECHNICAL FIELD

The present disclosure relates to computer systems and in particular to managing devices within a networked system.

BACKGROUND

Facilities devices, such as a uninterruptable power supplies, power distribution units, remote power panels, cooling equipment, generators, etc, oftentimes provide communication interfaces that enable various operational parameters of the devices to be monitored by a computer management system. However, there currently does not exist a standard approach for accessing such parameters. Instead, different manufacturers provide different application programming interfaces or other interfaces for reading, querying, or otherwise accessing parameter values (also referred to herein as "variables"). Moreover, different manufacturers, products, and/or versions of the same product may use different variable names when referring to the same type of parameter (e.g., input temperature, output temperature, power consumption, particular type of operational fault/alarm, etc.). Consequently, integrating new devices into a management system can be a laborious process and require operator expertise with both the management system and the particular devices.

SUMMARY

Some embodiments disclosed herein are directed to a management information base (MIB) mapping controller that maps requests from a common access interface containing common interface variables to device interface variables that address interfaces of electronic devices. The MIB mapping controller includes a processor and a memory having computer readable program code that when executed by the processor causes the processor to perform operations that include discovering presence of an electronic device accessible through a network connected to the MIB mapping controller. A MIB table contains information mapping device interface variables that address interfaces of electronic devices to common interface variables received through common access interface. The MIB table is accessed to determine whether the MIB table contains particular information mapping a device interface variable of the electronic device to one of the common interface variables received through the common access interface. Responsive to determining that the MIB table does not contain the particular information, new information is determined that maps the device interface variable of the electronic device to one of the common interface variables received through the common access interface. The new information is added to the MIB table.

Related methods in a MIB mapping controller are disclosed. It is noted that aspects described with respect to one embodiment may be incorporated in different embodiments although not specifically described relative thereto. That is, all embodiments and/or features of any embodiments can be combined in any way and/or combination. Moreover, other MIB mapping controllers, systems, methods, and/or computer program products according to embodiments will be or become apparent to one with skill in the art upon review of the following drawings and detailed description. It is intended that all such additional MIB mapping controllers, systems, methods, and/or computer program products be included within this description and protected by the accompanying claims.

BRIEF DESCRIPTION OF THE DRAWINGS

Aspects of the present disclosure are illustrated by way of example and are not limited by the accompanying drawings. In the drawings.

DETAILED DESCRIPTION

Figures 1, 2:
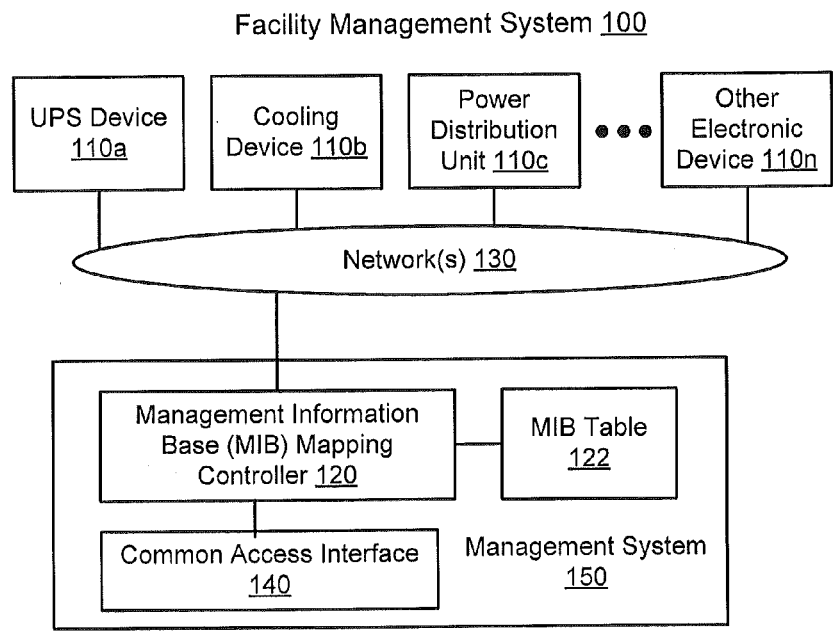
FIG. 1 is a block diagram of a facility management system containing a MIB mapping controller that maps requests from a common access interface containing common interface variables to device interface variables that address interfaces of electronic devices, in accordance with some embodiments.
FIG. 2 illustrates an example MIB table that the MIB mapping controller may generate for the electronic devices of FIG. 1, in accordance with some embodiments.

As will be appreciated by one skilled in the art, aspects of the present disclosure may be illustrated and described herein in any of a number of patentable classes or contexts including any new and useful process, machine, manufacture, or composition of matter, or any new and useful improvement thereof. Accordingly, aspects of the present disclosure may be implemented in entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product comprising one or more computer readable media having computer readable program code embodied thereon.

Any combination of one or more computer readable media may be used. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Some embodiments are directed to a management system for managing communications with electronic devices and, more particularly, to identifying and managing communications between the unique interface variables of electronic devices and a common set of interface variable that are known and used by a human operator or electronic system to access values of the electronic devices without having to know the unique interface variables of the electronic devices.

An example facility management system 100 is shown in FIG. 1 as including a management system 150, a Management Information Base (MIB) mapping controller 120, a MIB table 122, and various electronic devices that include an uninterruptible power supply (UPS) device 110a, a cooling device 110b, a power distribution unit (PDU) 110c, and another electronic device 110n. Although four electronic devices are shown in FIG. 1, the system 100 may include any number of electronic devices and operational types of electronic devices (e.g., remote power panels, power generators, power conditioners, fluid/gas pressure monitors/regulators, mechanical/electro-mechanical actuator controllers, environmental/electrical/optical sensors, etc.).

The management system 150 may include, but is not limited, a simple network management protocol (SNMP) based management system. SNMP is an Internet-standard protocol for managing devices on Internet protocol (IP) networks. SNMP exposes management data in the form of interface object identities (OIDs), which can then be queried or set/changed through the common access interface 140. Although various embodiments are described in the context of a SNMP, the management system 150 is not limited to SNMP and, may alternatively or additionally be a Modbus based management system and/or a BACnet based management system. A Modbus based management system exposes management data in the form of registers, and a BACnet based management system exposes management data as points. Accordingly, to support SNMP, Modbus, and BACnet, the MIB table 122 can provide mapping from SNMP OIDs to device interface variables, from Modbus registers to device interface variables, and from BACnet points to device interface variables, respectively, where the device interface variables correspond to the unique interface variables of different ones of the electronic devices 110a-n being monitored and/or controlled.

Moreover although embodiments are described in the context of facilities devices, the system 100 may more generally be used to control any type of electronic devices including, but not limited to, network routers, network switches, network server computers, user computers, peripheral devices (e.g. printers/scanners), IP telephones, IP video cameras, and communication modems/interfaces.

The management system 150 can obtain data values from and may further provide data values to interfaces of the electronic devices 110a-n through one or more communication networks 130 (e.g., one or more wired and/or wireless interfaces to local area networks and/or wide area networks which may include segments of the Internet). The management system 150 provides a common access interface 140 through which a human operator and/or an electronic system can use common interface variables to request data values from individual ones of the electronic devices 110a-n to monitor their status and provide data values to individual ones of the electronic devices 110a-n to control their operation.

Each of the electronic devices 110a-n may provide different device interface variables which address application programming interfaces (APIs) or other interfaces for reading, querying, writing, changing, or otherwise accessing parameter values (also referred to herein as "data values"). Moreover, different manufacturers, products, and/or versions of the same type of electronic device (e.g., two different manufacturers of UPS devices 110a' and 110a") may use device interface variables when addressing the same type of interface data (e.g., input temperature, output temperature, power consumption, voltage level, particular type of operational fault/alarm, etc.). Consequently, integrating new devices directly into the management system 150 may be a laborious process and require operator expertise with both the management system 150 and the particular electronic devices 110a-n.

Various embodiments of the present disclosure provide a MIB mapping controller 120 that can operate to facilitate integration of the electronic devices 110a-n with the management system 150 and facilitate communications between the electronic devices 110a-n and human operators and/or electronic systems that request access (e.g., read/modify) interface values of the electronic devices 110a-n through the common access interface 140. The MIB mapping controller 120 can operate to discover, or be informed of by an operator (e.g., via the common access interface 140), the presence of an electronic device (e.g., the UPS device 110a or another one of the electronic devices 110b-n) that is accessible through the network(s) 130. The electronic device can be identified through communication between the MIB mapping controller 120 and the electronic device and/or via an operator setup procedure.

The MIB mapping controller 120 responds to the new presence of the electronic device by accessing a MIB table 122, which contains information that maps device interface variables that addressing interfaces of electronic devices to common interface variables that are received in request through the common access interface 140, to determine whether the MIB table 120 contains particular information mapping a device interface variable of the electronic device to one of the common interface variables that is known outside the management system 150 and provided with requests made through the common access interface 140.

When the MIB table 120 does not contain the particular information, the MIB mapping controller 120 determines new information that maps the device interface variable for the interface of the electronic device to one of the common interface variables that can be received in a request through the common access interface 140 and which is used to commonly refer to at least one interface of each of a plurality of different ones of the electronic devices, and adds the new information to the MIB table 122.

At least some or all of the common interface variables can each be used in requests to access a plurality of different device interface variables. Accordingly, a human operator or electronic system can generate a request that references one of the common interface variables without knowing any of the device interface variables that are needed for accessing the particular interfaces of the electronic devices 110a-n. The MIB mapping controller 120 uses the MIB table 122 to translate the common interface variables to one or more device interface variables which are used to access the desired values of one or more of the electronic devices 110a-n.

FIG. 2 illustrates a non-limiting example MIB table 122 that the MIB mapping controller 120 may generate for the electronic devices 110a-n of FIG. 1. Referring to FIG. 2, the MIB table 122 includes a plurality of sub-tables 202a-n which may each correspond to a different one of the electronic devices 110a-n in a one-to-one corresponding manner, or each of one or more of the sub-tables 202a-n may correspond to a plurality of the electronic devices 110a-n. In the example of FIG. 2, MIB sub-table 202a contains information identifying the device interface variables for corresponding interfaces of the UPS device 110a and the corresponding common interface variables that can be requested (e.g., by human operators and/or electronic systems) through the common access interface 140.

The MIB sub-table 202a may further contain value translation information that identifies a plurality of different mathematical operations for translating data values communicated between the common access interface 140 and at least some different ones of the interfaces of the UPS device 110a.

The MIB sub-table 202a may further contain protocol information that identifies a plurality of different operational protocols used to obtain data values from at least some different ones of the interfaces of the UPS device 110a.

Example device interface variables for the sub-table 202a for the UPS device 110a may be used to obtain data values representing output power (kW), power factor, internal temperature, fault conditions, etc. Although the MIB sub-table 202a contains four rows corresponding to four different device interface variables addressing four interfaces of the UPS device 110a, the MIB sub-table 202a may contain information for any number of device interface variables.

Other sub-tables 202b-n may be similarly formatted to the sub-table 202a but may contain different numbers of device interface variables and corresponding common interface variables (depending upon the number of network accessible interfaces/values provided by the respective electronic device), and may similarly further contain data value translation information and/or protocol information for the associated device interface variables. Example device interface variables for the sub-table 202b for the cooling device 110b may be used to obtain data values representing inlet temperature to the cooling device 110b, output temperature from the cooling device 110b, air flow speed through the cooling device 110b, power consumption, humidity, etc.

The common access interface 140 can receive an access command that contains one of the common interface variables for one of the electronic devices 110a-n that requests reading (e.g., polling) of a data value from the interface of the electronic device. The MIB mapping controller 120 receives the command and uses the MIB table 122 to map the common interface variable of the command (which does not properly address a desired interface of a desired one of the electronic devices) to the device interface variable for the associated interface of the electronic device, and obtains one or more data values therefrom (e.g., temperature value(s), power parameter(s), fault parameter(s), and/or other operational parameter(s) of the electronic device).

The MIB mapping controller 120 and MIB table 122 may therefore operate to provide interface variable normalization functionality, which may provide a more uniform interface between the requests provided to the common access interface 140 and the unique interfaces of the electronic devices 110a-n. The common access interface 140 may access (e.g. read) a single data value or a plural set of data values that are defined by and calculated/derived from a set of polled data values. The MIB mapping controller 120 can be responsible for storing the associated data values as a time series set of data values which is referenced by one or more common interface variables defined in the MIB table 122.

In one illustrative example, the common access interface 140 may communicate a first access command containing one of the common interface variables associated with sensed device temperature and directed to the UPS device 110a. Although the first access command does not directly address the desired interface of the UPS device 110a which contains the referenced temperature data value and the human operator and/or electronic system that provided the first access command may not know the dimensional units (e.g., Centigrade, Kelvin, or Fahrenheit) and/or protocol used to access the referenced temperature data value, the MIB mapping controller 120 accesses the sub-table 202a for the UPS device 110a within the MIB table 122 to obtain the corresponding device interface variable for the particular interface of the UPS device 110a, and may further operate using protocol information defined therein to obtain the data value via the network 130 from the interface of the UPS device 110a addressed by the common interface variable. The MIB mapping controller 120 may select one of a plurality of different known mathematical operations based on the common interface variable from the first access command, translate the data value to a translated data value using the selected one of the plurality of different mathematical operations, and communicate the translated data value through common access interface 140 to the human operator and/or electronic device that provided the first access command.

The common access interface 140 may then similarly communicate a second access command containing the same common interface variable associated with sensed device temperature but which is now directed to the cooling device 110b. Again, the MIB mapping controller 120 accesses the sub-table 202b for the cooling device 110b within the MIB table 122 to obtain the corresponding device interface variable for the particular interface of the cooling device 110b, and may further operate using protocol information defined therein to obtain the data value via the network 130 from the interface of the cooling device 110b addressed by the common interface variable. The MIB mapping controller 120 may select one of a plurality of different known mathematical operations based on the common interface variable from the first access command, translate the data value to a translated data value using the selected one of the plurality of different mathematical operations, and communicate the translated data value through common access interface 140 to the human operator and/or electronic device that provided the second access command.

The MIB mapping controller 120 may be further configured to receive a single access command through the common access interface 140 and generate a plurality of access operations to a plurality of different interfaces of a same one of the electronic devices 110a-n and/or to one or more interfaces of a plurality of different electronic devices 110a-n. Thus, for example, the first and second access command may be combined into a single command resulting in the MIB mapping controller 120 responding to the common access interface 140 with translated data values representing sensed temperatures from interfaces of both of the UPS device 110a and the cooling device 110b.

Figure 3:
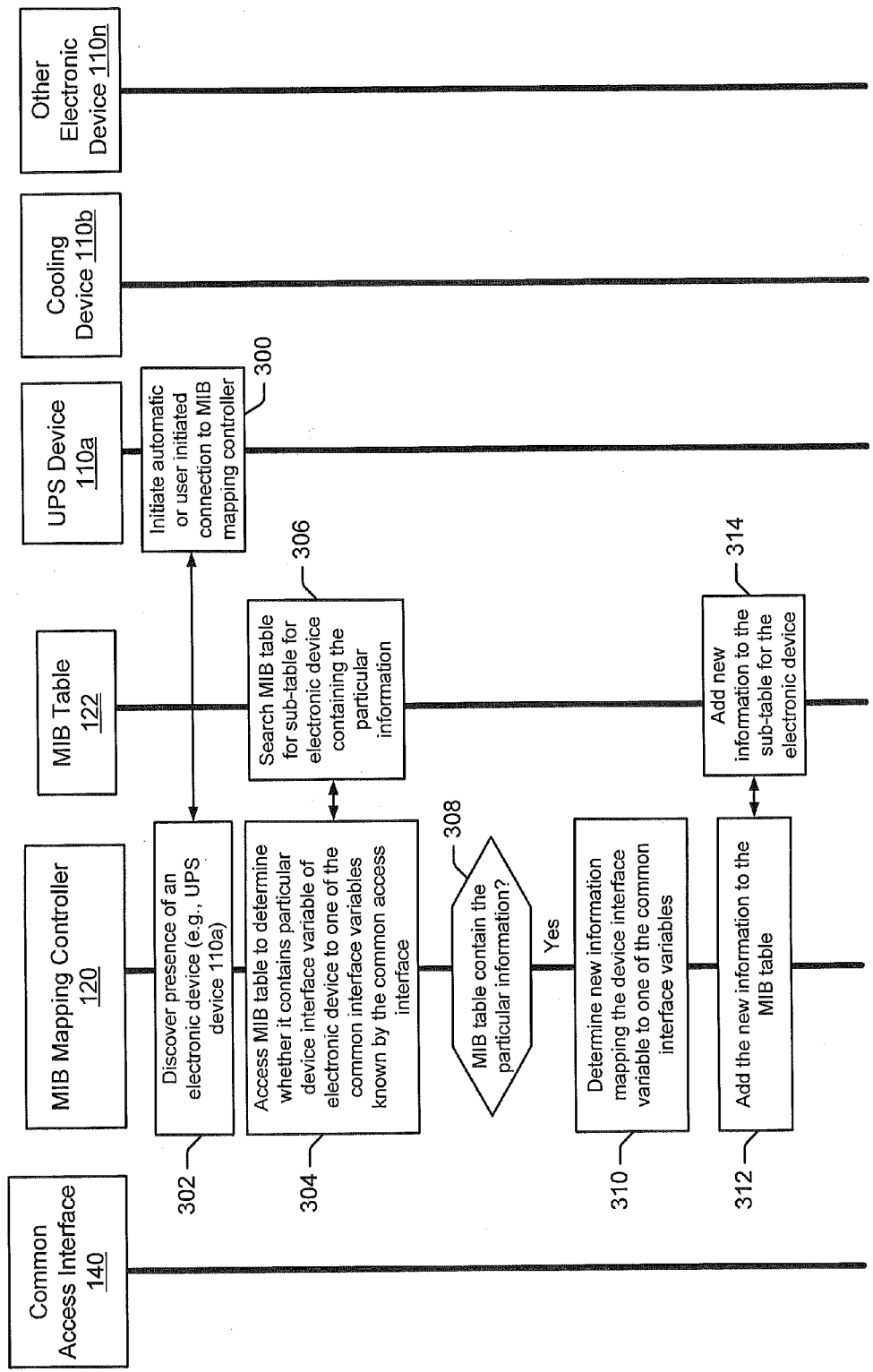
FIG. 3 illustrates flowcharts and data flow diagrams of example operations by which a MIB mapping controller can generate information entries in a MIB table, in accordance with some embodiments.
Figure 4:
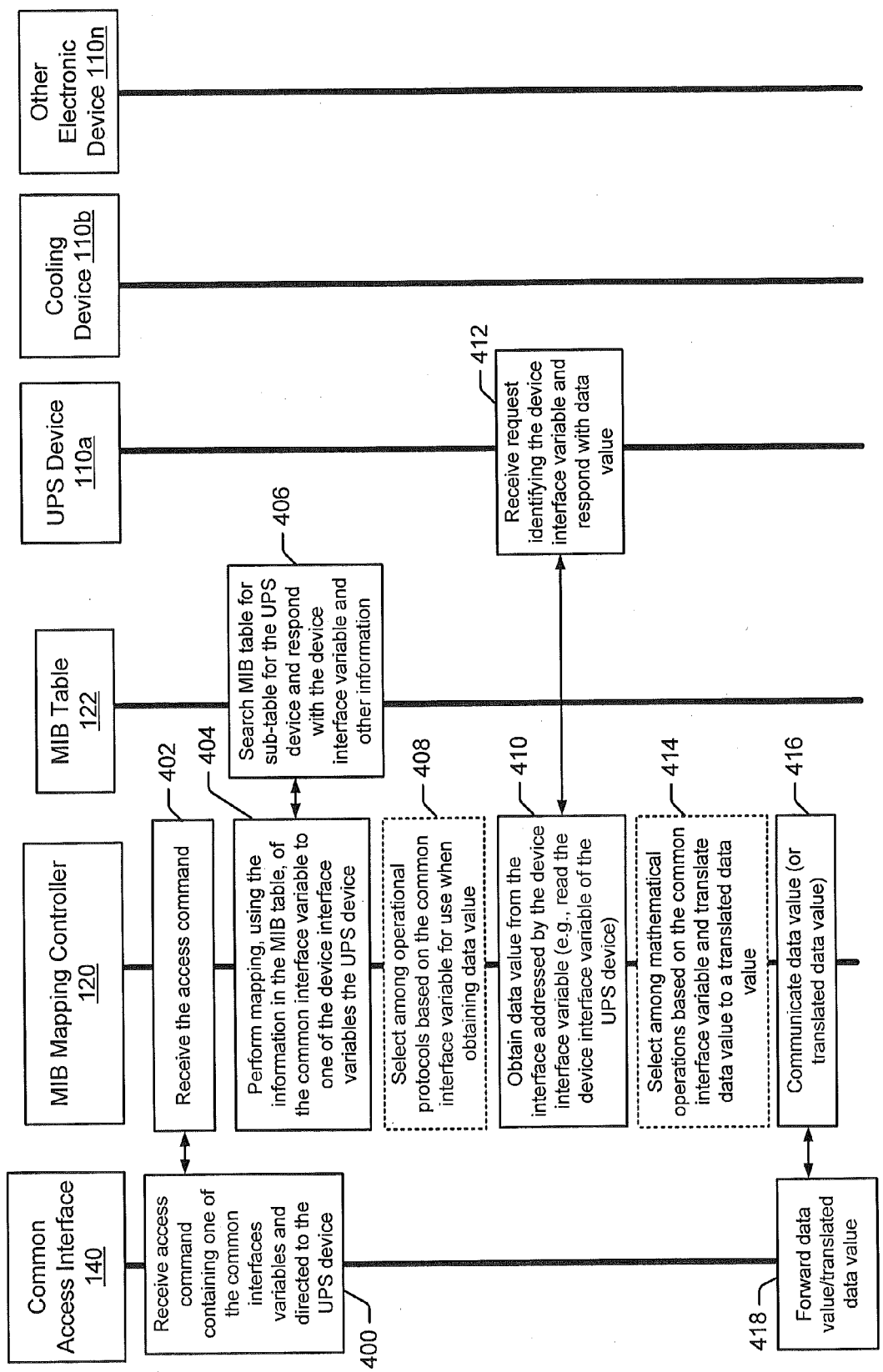
FIG. 4 illustrates flowcharts and data flow diagrams of example operations by which a MIB mapping controller can use a MIB table to facilitate a common access interface accessing data values from electronic devices, in accordance with some embodiments.

These and other example operations are described in further detail with regard to the operational flowcharts and data flow diagrams of FIGS. 3 and 4. FIG. 3 illustrates example operations by which the MIB mapping controller 120 can generate information entries in the MIB table 122 (e.g., generate sub-tables for each of the electronic devices). FIG. 4 illustrates example operations by which the MIB mapping controller 120 can use the MIB table 122 to facilitate the common access interface 140 accessing data values from the electronic devices. The illustrated operations may similarly be repeated to generate MIB table 122 entries for and/or to access other interfaces of the UPS device 110a and/or for other ones of the electronic devices 110b-n.

Referring to FIG. 3, the MIB mapping controller 120 discovers (block 302) the new presence of the UPS device 110a which is accessible through the network 130 connected to the MIB mapping controller 120. The MIB mapping controller 120 may discover the UPS device 110a through information provided by an operator of the common access interface 140 and/or by one or more conventional device discovery operations (block 300), such as, for example, Bluetooth and/or WLAN automatic network device discovery and registration.

The MIB mapping controller 120 accesses (block 304) the MIB table 122 to determine whether the MIB table 122 contains particular information mapping a device interface variable for an interface of the UPS device 110a to one of the common interface variables known by a human operator and/or electronic system that provides requests through the common access interface 140. The MIB table 120 responsively searches (block 306) for a sub-table 202a for the UPS device 110a containing the particular information.

Responsive to the MIB table 122 not containing (block 308) the particular information (e.g., no sub-table 202a has yet been created or does not contain information providing mapping between a newly identified interface of the UPS device 110a and one of the common interface variables), the MIB mapping controller 120 determines (block 310) new information mapping the device interface variable for the interface of the UPS device 110a to one of the common interface variables. The MIB mapping controller 120 then adds (block 312) the new information to the MIB table 122, which the MIB table 122, in turn, adds (block 314) to the sub-table 202a (e.g., creating a new sub-table or adding a new information entry to an existing sub-table) for the UPS device 110a.

To determine (block 310) the new information, the MIB mapping controller 120 may pole an interface of the UPS device 110a to obtain a data value, and select among the common interface variables based on a characteristic of the data value. The selection may include, determining a unit of measurement of the data value and selecting among the common interface variables based on the unit of measurement. Alternatively or additionally, the selection may include determining a range of possible values that are obtainable from the interface of the UPS device 110a based on the data value, and selecting among the common interface variables based on the range of possible values. Alternatively or additionally, the selection may include selecting one of a plurality of value ranges, defined by the MIB table 122 (e.g., defined by information in sub-table 202a), within which the data value fits, and selecting among the common interface variables based on the selected one of a plurality of value ranges.

The MIB mapping controller 120 may use a network accessible repository of information for use when determining the new information mapping the device interface variable for the interface of the UPS device 110a to one of the common interface variables. For example, the MIB mapping controller 120 may communicate with the UPS device 110a via the network 130 to request device identification (e.g., manufacturer identifier, model identifier, version identifier, etc.). The MIB mapping controller 120 may determine, based on the device identification, an Internet address of a repository of information that identifies characteristics of the UPS device 110a, and may query the repository of information to obtain a characteristic of the UPS device 110a. The MIB mapping controller 120 can then select among the common interface variables based on the characteristic of the UPS device 110a.

Referring now to FIG. 4, the MIB mapping controller 120 uses the MIB table 122 to facilitate the common access interface 140 accessing a data value from an interface of the UPS device 110a. The common access interface 140 receives from a human operator and/or from an electronic system (block 400) an access command containing one of the common interface variables, which is provide for receipt (block 402) to the MIB mapping controller 120. The MIB mapping controller 120 performs mapping (block 404), using the information contained in the MIB table 406, of the common interface variable from the access command to a particular one of the device interface variables for an interface of the UPS device 110a. The MIB table 122 searches (block 406) in the sub-table 202a for information that identifies the device interface variable for the interface of the UPS device 110a, and provides that information to the MIB mapping controller 120.

As explained above, the MIB table 122 may further contain protocol information (e.g., within sub-table 202a) that identifies a plurality of different operational protocols that can be used by the MIB mapping controller 120 to obtain data values from at least some different ones of the interfaces of the electronic devices. The MIB mapping controller 120 may select (block 408) one of the operational protocol based on the common interface variables from the access command in order to be able to properly obtain the data value from interface of the UPS device 110 using a selected proper operational protocol.

The MIB mapping controller 120 obtains a data value from the interface addressed by the device interface variable. The UPS device 110a can receive (block 412) one or more access commands (e.g., a read command) and provide a data value through the interface back to the MIB mapping controller 120, via the network 130. When the MIB sub-table 202a provides operational protocol information, the MIB mapping controller 120 may perform the selected operational protocol to obtain the data value via the network 130 from the interface of the UPS device 110a addressed by the particular one of the device interface variables.

As explained above, the MIB table 122 may further contain translation information (e.g., within sub-table 202a) that identifies a plurality of different mathematical operations that can be used by the MIB mapping controller 120 for translating data values between the MIB common access interface 140 and at least some different ones of the interfaces of the electronic devices.

The MIB mapping controller 120 may select (block 414) one of the mathematical operations based on the common interface variable from the access command, translating the data value to a translated data value using the selected mathematical operation.

The MIB mapping controller 120 communicates (block 416) the data value or, when translated, the translated data value towards the MIB common access interface 140. The common access interface 140 receives and forwards (block 418) the received data value/translated data value to the human operator (via an operator interface) and/or the electronic system that provided the access request. For example, the common access interface 140 may display on a display device the data value/translated data value and/or another value that is generated based thereon for review by a human operator and/or may communicate the data value/translated data value or another value generated based thereon to an electronic system. The common access interface 140 may receive and provide responsive control commands to control operation of the UPS device 110a and/or another one of the electronic devices 110b-n responsive to the data value/translated data value.

Example Control Node

Figure 5:
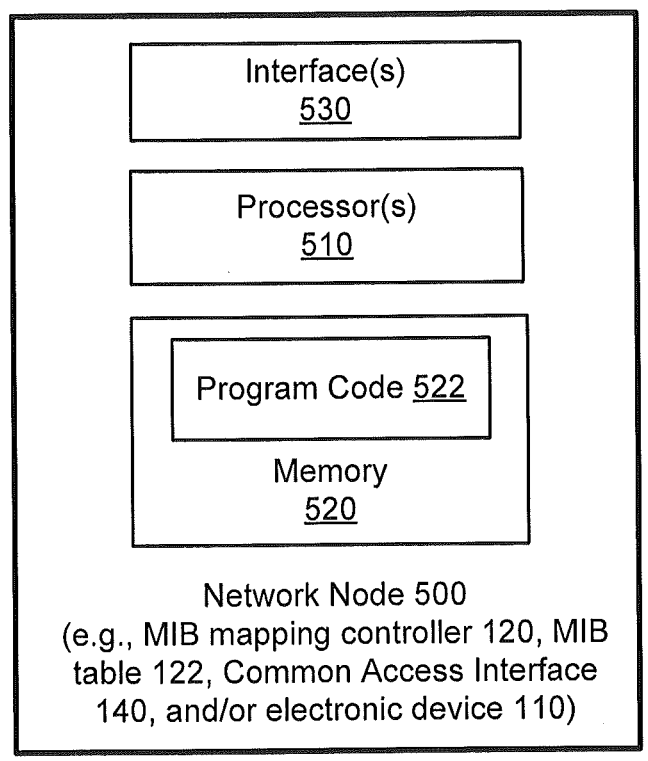
FIG. 5 is a block diagram of a network node which may be used as a MIB mapping controller, a MIB table, a common access interface, and/or an electronic device that is configured according to some embodiments.

FIG. 5 is a block diagram of a network node 500 that may be used as a MIB mapping controller 120, MIB table 122, common access interface 140, and/or an electronic device 110 that is configured to perform the operations of one of more of the embodiments disclosed herein. The MIB table 122 may alternatively be a simpler device that does not actively manage table additions and queries, and may be implemented as defined space in a memory device. The network node 500 can include one or more interfaces 530 that may communicate directly with another component of the system 100 or indirectly through the network 130, one or more processors 510 (referred to as "processor" for brevity), and one or more memories 520 (referred to as "memory" for brevity) containing program code 522.

The processor 510 may include one or more data processing circuits, such as a general purpose and/or special purpose processor (e.g., microprocessor and/or digital signal processor) that may be collocated or distributed across one or more networks. The processor 510 is configured to execute program code 522 in the memory 520, described below as a computer readable medium, to perform some or all of the operations and methods that are described above for one or more of the embodiments, such as one or more of the embodiments of FIGS. 1-4. Accordingly, the processor 510 can be configured by execution of the program code 522 to carry out at least some of the functionality disclosed herein to control deployment of resources in a distributed computing system for processing request from user electronic devices.

Further Definitions and Embodiments

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an"

and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Like reference numbers signify like elements throughout the description of the figures.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

The invention claimed is:

1. A management information base (MIB) mapping controller comprising:
    a common access interface circuit that communicates with electronic devices through a network;
    a processor coupled to the common access interface circuit; and
    a memory coupled to the processor and comprising computer readable program code that when executed by the processor causes the processor to perform operations comprising:
        discovering presence of an electronic device accessible through the network connected to the common access interface circuit of the MIB mapping controller;
        accessing a MIB table, containing information mapping device interface variables for interfaces of the electronic devices to common interface variables, to determine whether the MIB table contains particular information mapping a device interface variable for an interface of the electronic device to one of the common interface variables;
        responsive to determining that the MIB table does not contain the particular information,
            determining new information mapping the device interface variable for the interface of the electronic device to one of the common interface variables, and
            adding the new information to the MIB table;
        receiving through the common access interface circuit from an electronic system, an access command containing one of the common interface variables;
        mapping, using the information contained in the MIB table, the one of the common interface variables from the access command to a particular one of the device interface variables for an interface of one of the electronic devices; and
        obtaining a data value via the common access interface circuit and the network from the interface of the electronic device addressed by the particular one of the device interface variables,
    wherein the MIB table further contains translation information that identifies a plurality of different mathematical operations for translating data values between the common access interface circuit and at least some different ones of the device interface variables for interfaces of the electronic devices; and
    the operations further comprise:
        selecting one of the plurality of different mathematical operations based on the one of the common interface variables from the access command;
        translating the data value to a translated data value using the selected one of the plurality of different mathematical operations; and
        communicating the translated data value through the common access interface circuit to the electronic system.

2. The MIB mapping controller of claim 1, wherein determining new information mapping the device interface variable for the interface of the electronic device to one of the common interface variables, comprises:
    polling an interface of the electronic device through the common access interface circuit and the network to obtain a data value; and
    selecting among the common interface variables based on a characteristic of the data value.

3. The MIB mapping controller of claim 2, wherein selecting among the common interface variables based on a characteristic of the data value, comprises:
    determining a unit of measurement of the data value; and
    selecting among the common interface variables based on the unit of measurement.

4. The MIB mapping controller of claim 2, wherein selecting among the common interface variables based on a characteristic of the data value, comprises:
    determining a range of possible values that are obtainable through the device interface variable for the interface of the electronic device based on the data value; and
    selecting among the common interface variables known by the common access interface circuit based on the range of possible values.

5. The MIB mapping controller of claim 2, wherein selecting among the common interface variables known by the common access interface circuit based on a characteristic of the data value, comprises:
    selecting one of a plurality of value ranges, defined by the MIB table, within which the data value fits; and
    selecting among the common interface variables based on the selected one of a plurality of value ranges.

6. The MIB mapping controller of claim 1, wherein the operations further comprise;
    for each a plurality of the electronic devices each having a plurality of interfaces, generating a sub-table within the MIB table containing information mapping device interface variables for the plurality of interfaces of one of the plurality of electronic devices to a plurality of the common interface variables.

7. The MIB mapping controller of claim 6, wherein at least one of the sub-tables within the MIB table contains information providing a one-to-one mapping from the device interface variables, for each of the plurality of interfaces of one of the plurality of the electronic devices, to the plurality of the common interface variables.

8. A management information base (MIB) mapping controller comprising:
- a common access interface circuit that communicates with electronic devices through a network;
- a processor coupled to the common access interface circuit; and
- a memory coupled to the processor and comprising computer readable program code that when executed by the processor causes the processor to perform operations comprising:
  - discovering presence of an electronic device accessible through the network connected to the common access interface circuit of the MIB mapping controller;
  - accessing a MIB table, containing information mapping device interface variables for interfaces of the electronic devices to common interface variables, to determine whether the MIB table contains particular information mapping a device interface variable for an interface of the electronic device to one of the common interface variables;
  - responsive to determining that the MIB table does not contain the particular information,
    - determining new information mapping the device interface variable for the interface of the electronic device to one of the common interface variables, and
    - adding the new information to the MIB table;
  - receiving through the common access interface circuit from an electronic system, an access command containing one of the common interface variables;
  - mapping, using the information contained in the MIB table, the one of the common interface variables from the access command to a particular one of the device interface variables for an interface of one of the electronic devices; and
  - obtaining a data value via the common access interface circuit and the network from the interface of the electronic device addressed by the particular one of the device interface variables,
  - wherein the MIB table farther contains protocol information that identifies a plurality of different operational protocols used to obtain data values from at least some different ones of the interfaces of the electronic devices; and
  - the operations further comprise:
    - selecting one of the plurality of different operational protocols based on the one of the common interface variables from the access command; and
    - performing the selected one of the plurality of different operational protocols communicating through the through the common access interface circuit to obtain the data value via the network from the interface of the electronic device using the particular one of the device interface variables.

9. The MIB mapping controller of claim 8, wherein determining new information mapping the device interface variable for the interface of the electronic device to one of the common interface variables, comprises;
- communicating with the electronic device through the common access interface circuit and via the network to request device identification;
- determining, based on the device identification, an Internet address of a repository of information that identifies characteristics of electronic devices;
- querying the repository of information to obtain a characteristic of the electronic device; and
- selecting among the common interface variables based on the characteristic of the electronic device.

10. A method in a management information base (MIB) mapping controller, comprising;
- discovering presence of an electronic device accessible through a common access interface circuit connected to the MIB mapping controller via a network;
- accessing a MIB table, containing information mapping device interface variables for interfaces of electronic devices to common interface variables, to determine whether the MIB table contains particular information mapping a device interface variable for an interface of the electronic device to one of the common interface variables;
- responsive to determining that the MIB table does not contain the particular information,
  - determining new information mapping the device interface variable for the interface of the electronic device to one of the common interface variables, and
  - adding the new information to the MIB table;
- receiving through the common access interface circuit from an electronic system an access command containing one of the common interface variables;
- mapping, using the information contained in the MIB table, the one of the common interface variables from the access command to a particular one of the device interface variables for an interface of one of the electronic devices; and
- obtaining a data value via the common access interface circuit and the network from the interface of the electronic device addressed by the particular one of the device interface variables,
- wherein the MIB table further contains translation information that identifies a plurality of different mathematical operations for translating data values between the common access interface circuit and at least some different ones of the device interface variables for interfaces of the electronic devices; and
- the method further comprises:
  - selecting one of the plurality of different mathematical operations based on the one of the common interface variables from the access command;
  - translating the data value to a translated data value using the selected one of the plurality of different mathematical operations; and
  - communicating the translated data value through the common access interface circuit to the electronic system.

11. The method of claim 10, wherein determining new information mapping the device interface variable for the interface of the electronic device to one of the common interface variables, comprises:
- polling an interface of the electronic device through the common access interface circuit and the network to obtain a data value; and
- selecting among the common interface variables based on a characteristic of the data value.

12. The method of claim 11, wherein selecting among the common interface variables based on a characteristic of the data value, comprises
- determining a unit of measurement of the data value; and
- selecting among the common interface variables based on the unit of measurement.

13. The method of claim 11, wherein selecting among the common interface variables based on a characteristic of the data value, comprises:

determining a range of possible values that are obtainable through the device interface variable for the interface of the electronic device based on the data value; and selecting, among the common interface variables known by the common access interface circuit based on the range of possible values.

14. The method of claim 11, wherein selecting among the common interface variables known by the common access interface circuit based on a characteristic of the data value, comprises:

selecting one of a plurality of value ranges, defined by the MIB table, within which the data value fits; and selecting among the common interface variables based on the selected one of a plurality of value ranges.

15. The method of claim 10, further comprising;

for each a plurality of electronic devices each having a plurality of interfaces, generating a sub-table within the MIB table containing information mapping device interface variables for the plurality of interfaces of one of the plurality of electronic devices to a plurality of the common interface variables.

16. The method of claim 15, wherein at least one of the sub-tables within the MIB table contains information providing a one-to-one mapping from the device interface variables, addressing each of the plurality of interfaces of one of the plurality of electronic devices, to the plurality of the common interface variables.

17. A method in a management information base (MIB) mapping controller, comprising:

discovering presence of an electronic device accessible through a common access interface circuit connected to the MIB mapping controller via a network;

accessing a MIB table, containing information mapping device interface variables for interfaces of electronic devices to common interface variables, to determine whether the MIB table contains particular information mapping a device interface variable for an interface of the electronic device to one of the common interface variables;

responsive to determining that the MIB table does not contain the particular information, determining new information mapping the device interface variable for the interface of the electronic device to one of the common interface variables, and adding the new information to the MIB table receiving through the common access interface circuit from an electronic system an access command containing one of the common interface variables;

mapping, using the information contained in the MIB table, the one of the common interface variables from the access command to a particular one of the device interface variables for an interface of one of the electronic devices; and obtaining a data value via the common access interface circuit and the network from the interface of the electronic device addressed by the particular one of the device interface variables, wherein the MIB table further contains protocol information that identifies a plurality of different operational protocols used to obtain data values from at least some different ones of the interfaces of the electronic devices; and the method further comprises:

selecting one of the plurality of different operational protocols based on the one of the common interface variables from the access command; and performing the selected one of the plurality of different operational protocols communicating through the through the common access interface circuit to obtain the data value via the network from the interface of the electronic device using the particular one of the device interface variables.

18. The method of claim 17, wherein determining, new information mapping the device interface variable for the interface of the electronic device to one of the common interface variables, comprises:

communicating with the electronic device through the common access interface circuit and via the network to request device identification;

determining, based on the device identification, an Internet address of a repository of information that identifies characteristics of electronic devices;

querying the repository of information to obtain a characteristic of the electronic device; and selecting among the common interface variables based on the characteristic of the electronic device.

* * * * *